United States Patent
Chimura et al.

(10) Patent No.: US 6,694,829 B2
(45) Date of Patent: Feb. 24, 2004

(54) LOAD CELL WITH A COATING

(75) Inventors: Yukiko Chimura, Kusatsu (JP); Yukio Wakasa, Ritto (JP)

(73) Assignee: Ishida Co., Ltd., Shiga (JP)

( * ) Notice: Subject to any disclaimer, the term of this patent is extended or adjusted under 35 U.S.C. 154(b) by 0 days.

(21) Appl. No.: 10/058,966

(22) Filed: Jan. 30, 2002

(65) Prior Publication Data

US 2002/0139203 A1 Oct. 3, 2002

Related U.S. Application Data

(63) Continuation-in-part of application No. PCT/JP01/04574, filed on May 30, 2001.

(30) Foreign Application Priority Data

May 31, 2000 (JP) ........................................ 2000-162125

(51) Int. Cl.$^7$ ................................................. G01L 1/04
(52) U.S. Cl. ................................................ 73/862.627
(58) Field of Search .................... 73/795, 796, 862.627, 73/862.628, 862.629, 862.632, 862.633, 862.634, 862.636, 862.637

(56) References Cited

U.S. PATENT DOCUMENTS

| 4,267,724 A | * | 5/1981 | Spoor ..................... 73/862.628 |
| 4,432,247 A | * | 2/1984 | Takeno et al. .......... 73/862.623 |
| 4,628,296 A | * | 12/1986 | Kitagawa et al. ............... 338/3 |
| 4,630,491 A | * | 12/1986 | Kitagawa et al. ...... 73/862.622 |
| 4,633,721 A | * | 1/1987 | Nishiyama ............. 73/862.628 |
| 4,813,504 A | * | 3/1989 | Kroll ........................... 177/21 |
| 5,553,486 A | * | 9/1996 | Bonin ......................... 73/105 |

* cited by examiner

Primary Examiner—Max Noori
(74) Attorney, Agent, or Firm—Shinjyu Global IP Counselors, LLP

(57) ABSTRACT

A load cell 1 includes a strain body 2, a bridge circuit and a coating film 10. The bridge circuit is formed of a strain gauge 7 arranged on the strain body 2. The coating film 10 is formed on the strain body 2, covers at least a portion of the strain body 2 attached to a member made of a metal material dissimilar to the strain body and a strain occurring portion of the strain body 2 except for a portion to be attached to the strain gauge 7, includes a coating layer made of resin having a glass transition temperature of 40° C. or more, and has an electrical insulating property.

29 Claims, 10 Drawing Sheets

Fig. 8
(a)
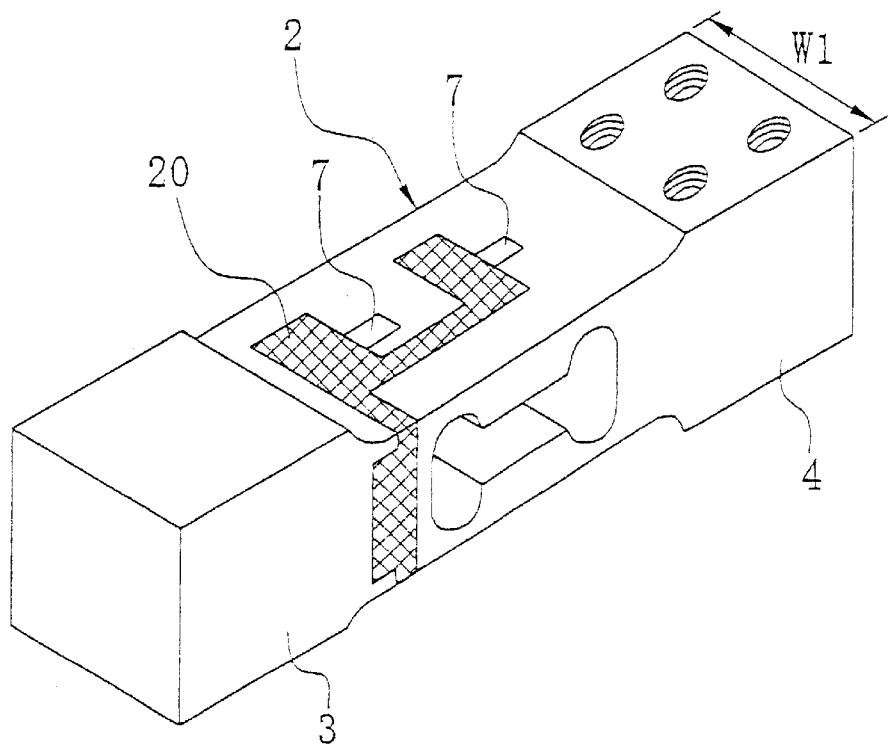
(b)
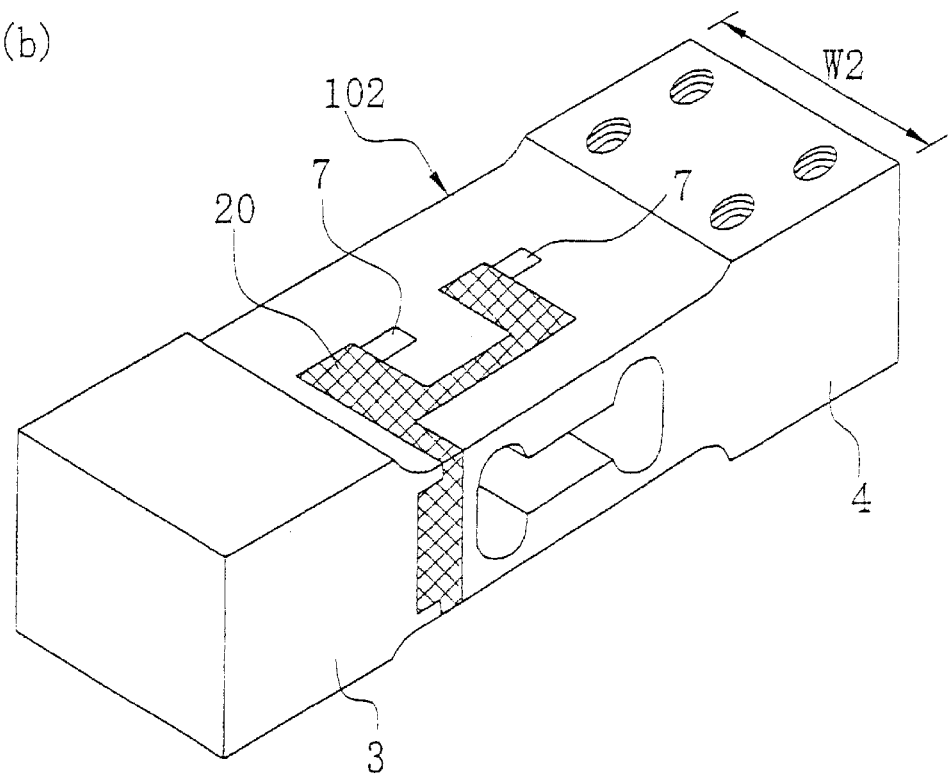

Before Test        After Test

LOAD CELL WITH A COATING

This is a continuation-in-part of International Application PCT/JP01/04574, with an international filing date of May 30, 2001, not yet published.

BACKGROUND OF THE INVENTION

1. Field of the Invention

The present invention relates to a load cell, and particularly to a load cell provided with a strain body and a sensor for detecting a displacement of the strain body caused by a load.

2. Background Information

In general, a load cell used in a measuring device or the like has a strain body (i.e., a body to be strained) having a movable portion and a fixed portion, and a sensor for detecting a displacement of a strain body caused by a load applied thereto. A result of the detection is converted into a weight of a measuring target object, i.e., an object to be measured.

The movable portion of the strain body of the load cell is fixed to a support member supporting the measuring target object, or is fixed to a connection member, which connects the support member to the strain body, and will be referred to as a "measuring target side member" hereinafter. The fixed portion of the strain body is fixed to a fixed base or a connection member, which connects the fixed base to the fixed portion of the strain body, and will be referred to as a "fixed base side member" hereinafter. When a load of the measuring target member acts on the strain body via the measuring target side member, the movable portion of the strain body is displaced downward relatively to the fixed portion. This displacement is detected by a sensor such as a strain gauge, and is converted into a weight.

The strain body of the load cell is often made of aluminum or aluminum alloy primarily in view of demand for high precision and workability. The measuring target side member and the fixed base side member are primarily made of a material such as steel or stainless steel.

Accordingly, a connection between the strain body and the measuring target side member as well as a connection between the strain body and the fixed base side member are in such a state that dissimilar metal materials are electrically in contact with each other. Therefore, if an atmosphere containing oxygen and/or moisture is present around these connections, electricity flows between the dissimilar metal materials to cause galvanic corrosion so that corrosion expands rapidly to reduce a lifetime of the load cell.

For overcoming the above disadvantages, the strain body may be made of stainless steel. However, it is difficult to ensure a high weight detection precision, and particularly, it is difficult to use the stainless steel instead of aluminum from the viewpoint of a processing or working cost.

For preventing the galvanic corrosion, the strain body may be coated with a molded material such as silicone or polyurethane. However, the molded material, which is present between the member on the measuring target side or fixed base side and the strain body, deteriorates a weight detection precision due to viscoelastic properties of the molded material. If a molded material having a thickness from hundreds of micrometers to several millimeters is present between the member on the measuring target side or fixed base side and the strain body, this lowers the degree of fixing between the measuring target side member and the strain body as well as the degree of fixing between the fixed base side member and the strain body. Also, deformation of the molded material caused by the load deteriorates the weight detection precision. Accordingly, molding is effected on the strain body, which is already attached to the measuring target side member and the fixed base side member. However, this requires a complicated work for molding, and increases a working cost.

The molding may be effected on the strain body alone while masking the movable portion and fixed portion. However, this cannot prevent the galvanic corrosion.

Further, for preventing the corrosion of the strain body, the strain body may be covered with a box made of stainless steel after attaching the measuring target side member and the fixed base side member to the strain body. However, this requires a devised structure for preventing restraint on movements of the measuring target side member and the movable portion of the strain body, resulting in disadvantages relating to the cost and size.

As another manner for preventing the galvanic corrosion, a film having an insulating property may be interposed between dissimilar metal materials. In this manner, however, water enters a fine space between the strain body and the film to cause corrosion. As still another manner, a member made of a relatively soft material may be interposed between dissimilar metal materials. In this manner, however, the load of the measuring target object is not transmitted 100% to the load cell so that an error occurs in a result of measurement.

If a scale including the strain body is used, e.g., in hot and humid surroundings or in a place exposed to salt-laden moisture of seawater or the like, corrosion occurs on the contact surfaces of dissimilar metal materials, and is also liable to occur on other surfaces.

In view of the above, there exists a need for a load cell which overcomes the above mentioned problems in the prior art. This invention addresses this need in the prior art as well as other needs, which will become apparent to those skilled in the art from this disclosure.

SUMMARY OF THE INVENTION

An object of the invention is to provide a load cell, which can suppress galvanic corrosion in a contact portion between the strain body and the member attached or connected to the strain body, and also can ensure a sufficient degree of fixing between the strain body and the member attached to the strain body so that a high weight detection precision can be achieved.

Also an object of the invention is to provide a load cell, which has improved resistance to water, rust and corrosion, and can achieve high weight detection precision.

According to a first aspect, a load cell includes a strain body, a bridge circuit and a coating film. The bridge circuit is formed of a strain gauge arranged on the strain body. The coating film is formed on the strain body, covers at least a portion of the strain body attached to a member made of a metal material dissimilar to the strain body, includes a coating layer made of resin having a glass transition temperature of 40° C. or more, and has an electrical insulating property.

According to the load cell, when a load on a measuring target side acts on the strain body, a strain gauge detects a displacement of the strain body caused by the load. Since the degree of displacement of the strain body depends on the magnitude of the load applied by a measuring target object, the weight of the measuring target object is obtained from the result of detection of the strain gauge.

In the above structure, the coating film having the insulating property covers the portion of the strain body, to which the dissimilar metal member (i.e., the member made of a metal material dissimilar to the strain body) is attached, so as to prevent galvanic corrosion in such a case that the dissimilar metal member is in contact with the strain body. Thus, in the structure having the dissimilar metal member attached to the strain body, the coating film having the insulating property is interposed between the dissimilar metal member and the strain body. Therefore, an electricity hardly flows between the dissimilar metal member and the strain body, although these are made of different kinds of metal, respectively.

The dissimilar metal member attached to the strain body may be a fixing member for fixing a portion of the strain body to the fixed base, a movable member for transmitting a load of the measuring target object to another portion of the strain body, a stop or limiter member such as a screw or a metal piece for restricting deformation of the strain body caused by an excessive load, and/or a board provided, e.g., with a line terminal portion between the strain gauge and external wiring and/or an amplifier for amplifying a strain gauge output.

In contrast to the above, if a coating film were not present between the dissimilar metal member and the strain body, the strain body would be corroded due to a current flow between the dissimilar metal member and the strain body when oxygen and moisture were present therebetween.

According to the load cell of the first aspect, as described above, the coating film covers at least the portion of the strain body, which may be in contact with the dissimilar metal member. Therefore, the strain body is not in direct contact with the dissimilar metal member attached thereto, and is in contact with the same through the coating film. Since the coating film has the insulating property, a current does not flow between the dissimilar metal member and the strain body, and thus the flow between dissimilar metal materials is interrupted.

In the above structure, since the coating film is interposed between the strain body and the dissimilar metal member attached thereto the degree of fixing between the strain body and the dissimilar metal member may be lowered, and the weight detection precision may be adversely affected. However, these disadvantages are extremely smaller than the disadvantages caused by a thick molded member or other thick members for the insulation. Also, the glass transition temperature is 40° C. or more, and therefore the coating film is hard in a temperature range from −10° C. to 40° C., which is an operation temperature range of this kind of scale. In other words, since the coating film is extremely thin and hard, high weight detection precision can be maintained while insulating the strain body from the dissimilar metal member fixed or attached thereto and hardly affecting the degree of fixing of them.

The strain gauge may be attached directly to the strain body, or may be formed on the strain body as disclosed in Japanese Patent No. 2,506,064.

The coating film may be formed by application or by another manner such as vapor deposition or sputtering.

The coating film of the load cell of the invention may be formed not only on the portion of the strain body to be in contact with the dissimilar metal, or may be formed of the whole surface of the strain body, as will be described later. In this case, the surface other than the surface in contact with the dissimilar metal may be coated with a film of the same material as that covering the dissimilar metal contact surface or a film of a different material. The portion other than the dissimilar metal contact portion may be molded with a conventional mold material.

The coating film may be organic paint, or may be organic/inorganic hybrid paint (ceramic paint), as will be described later.

For example, acryl resin filled with an inorganic filler may be used for the dissimilar metal contact surface, and a conventional rubber-contained resin may be used for the other surface.

In the case where the coating film layer is formed over the whole surface of the strain body, it is possible to interrupt the current between the strain body and the dissimilar metal member, and thereby to suppress corrosion of the strain body. Further, it is possible to suppress contact of oxygen and moisture in an atmosphere with the strain body, and thereby to suppress occurrence and progression of corrosion of the strain body. In this case, therefore, the resistance to water, rust and corrosion can be improved.

In conventional structures, an elastic material such as rubber or polyurethane has been used in a film, which coats the strain body for achieving intended resistance to water, rust and galvanic corrosion, in view of suppressing by the elasticity an influence on deformation of the strain body.

A scale (measuring device) provided with a load cell of the same type as that of the present invention is generally used in a temperature range (i.e., operation temperature range) from −10° C. to 40° C., and the elastic properties and viscosity properties of the foregoing material such as rubber or polyurethane have a temperature dependency in this operation temperature range. Particularly, if the weighing capacity is small (10 kg or lower), the viscosity properties exert a large influence, which cannot be substantially corrected.

In this load cell, therefore, the coating layer is formed by coating the strain body surface with resin having a high glass transition temperature, i.e., with hard resin so as to suppress an adverse effect, which may be exerted on the change in electric resistance of the strain gauge by the load. Since the change in viscosity properties of this kind of resin is extremely small even in the above operation temperature range, it is possible to provide the load cell having high precision and good resistance to water.

As already described, if a conventional structure is provided with an insulating film between the surfaces of the strain body and the dissimilar metal member, water enters a space to cause corrosion. If a soft material is interposed, a load of the measuring target object is not accurately transmitted to the load cell, resulting in a measuring error.

According to the load cell of the above aspect, however, the strain body surface is coated with the resin having a high glass transition temperature, and thus the hard resin having an insulating property as described above. Therefore, no gap is present between the strain body and the coating film, and thus entry of water does not occur so that the load cell can have a good resistance to water.

Since the hard resin is interposed between the dissimilar metal materials, the load applied from the measuring target object is reliably transmitted.

According to a second aspect, a load cell includes a strain body, a bridge circuit and a coating film. The bridge circuit is formed of a strain gauge arranged on the strain body. The coating film is formed on the strain body, covers at least a strain occurring portion of the strain body except for a portion attached to the strain gauge, includes a coating layer made of resin having a glass transition temperature of 40° C. or more, and has an electrical insulating property.

In the structure having the coating film interposed between the strain body and the strain gauge, a displacement of the strain body cannot be accurately reflected in an output value of the strain gauge in some cases, depending on the properties and thickness of the coating film. In the load cell of this aspect, therefore, the coating film is not formed over the portion, to which the strain gauge is attached. For this, such a manner may be employed that the paint is applied to the strain body while masking the portion to be used for attaching the strain gauge.

In the structure having wiring connected to the strain gauge, it is preferable to cover the wiring and the strain gauge with waterproof resin. In this case, since the strain gauge and the wiring are covered with the waterproof resin covering at least the masked portion described before, such a situation can be suppressed that moisture in an atmosphere adversely affects the strain gauge and the wiring. Since the strain gauge is covered with the resin, the surface of the strain body (i.e., uncoated surface) is not exposed even at the vicinity of the strain gauge. This can further suppress occurrence and progression of corrosion of the strain body.

The strain gauge and the wiring may be covered, e.g., by applying silicone resin over a waterproof butyl rubber sheet.

According to a third aspect, a load cell includes a strain body, a bridge circuit and a coating film. The bridge circuit is formed of a strain gauge arranged on the strain body. The coating film is formed on the strain body, covers at least a portion of the strain body attached to a member made of a metal material dissimilar to the strain body and a strain occurring portion of the strain body except for a portion to be attached to the strain gauge, includes a coating layer made of resin having a glass transition temperature of 40° C. or more, and has an electrical insulating property.

This aspect particularly relates to a structure, in which the coating film is formed at least over the dissimilar metal contact surface and the strain occurring portion other than the portion, to which the strain gauge is attached.

According to a fourth aspect, the load cell of the third aspect further has such a feature that the resin of the coating layer is acryl resin.

More specifically, the foregoing resin having a high glass transition temperature may be acryl resin (Tg=90° C.–105° C.), melamine resin (thermosetting resin), phenylic resin (thermosetting resin) or fluororesin (PTFE: polytetrafluoroethylene resin, Tg=130° C.; PFA: perfluoroalkoxyethylene, Tg=75° C.). The acryl resin is superior because it allows easy introduction of cross linkage as well as easy production of hybrid composition with inorganic filler, and also allows easy application for coating.

In the load cell of this aspect, therefore, the acryl resin is used for coating the strain body so that intended precision of the scale can be maintained without preventing galvanic corrosion, and further the strain body may have improved resistance to water.

The acryl resin may be the same as that disclosed in pamphlet No. WO96/34063. It is preferable to use (meth-)acrylate of lower alkyl alcohol, and is particularly preferable to use copolymer of methyl methacrylate and hydroxyethyl methacrylate.

According to a fifth aspect, the load cell of the fourth aspect further has such a feature that the acryl resin is cross-linked to form a three-dimensional structure.

The resin having the three-dimensional structure, which is produced by the cross-linking, is superior in stability of the coating layer against changes in environment, and particularly in resistance to water and moisture. In this aspect, therefore, the strain body is coated with such resin to provide the coating film having good resistance to water and moisture so that the strain body can have improved resistance to water.

In this aspect, the resin having a high cross-link density is used so that the coating layer can be hard and resistant to a scratch or damage by an external force. Therefore, the strain body can keep intended resistance to rust for a long term.

For introducing the cross-links in the resin, it is preferable to employ such a manner that a monomer (e.g., hydroxyethyl methacrylate) having a functional group capable of forming cross-links is partially copolymerized, a di-isocyanate compound is mixed in the resin, and a heat treatment is effected on the coating layer applied to the strain body. Thereby, it is possible to provide the three-dimensional structure by introducing the cross-links.

According to a sixth aspect, the load cell of the fifth aspect further has such a feature that the coating film further has an anodized aluminum layer, and the coating layer is formed on a surface of the anodized aluminum layer.

The strain body is preferably made of aluminum in view of weight precision. If the strain body of aluminum is anodized, a corrosion-resistant oxide coating is formed over the surface of the aluminum, and many fine holes are formed at the surface of the strain body. These holes improve the adhesion of the coating layer to the strain body. Even when a damage is formed on the coating layer, the background layer formed of the hard anodized aluminum layer can prevent exposure of the aluminum alloy having low corrosion resistance. The anodizing in synergy with the application of the coating film effectively suppresses the galvanic corrosion, and can provide the rustproof performance.

By forming the coating film after the anodizing of the strain body surface, the resistance to acid and alkali, which cannot be sufficiently achieved by the anodizing alone, can be improved.

Further, the electrical insulating property of the anodized aluminum layer improves the electrical insulating property in the whole coating film.

Copper-contained aluminum alloy, which is generally used in load cells, cannot have sufficient resistance to galvanic corrosion even if anodizing is effected on the surface because the anodized aluminum film thus formed have many defects. According to the load cell of the present invention, however, the coating layer is additionally formed on the surface of the anodized aluminum layer so that the coating layer fills the defects in the anodized aluminum film.

According to a seventh aspect, the load cell of the sixth aspect further has such a feature that the coating film has a thickness equal to or larger than 1 $\mu$m and smaller than 100 $\mu$m.

In this aspect, the coating film has the thickness not exceeding 100 $\mu$m so that an intended weight detection precision may be maintained by ensuring an intended degree of fixing between the strain body and the dissimilar metal member attached to the strain body. Thereby, reduction in the degree of fixing, which may be caused by the interposition of the coating film between the strain body and the dissimilar metal member, can be suppressed to an extent, which hardly affects the weight detection precision.

In a conventional structure including a molded material, which has a thickness from hundreds of micrometers to several millimeters, and is present between the strain body and the dissimilar metal member, it is probably impossible to maintain the intended weight detection precision. According to the present invention, however, the insulation is achieved by the coating film smaller than 100 μm in thickness so that the galvanic corrosion can be prevented while maintaining the weight detection precision.

The appropriate thickness of the coating film depends on the kind and size of the load cell. If the thickness of the coating film were excessively small, and did not exceed one μm, a damage would often occur on the coating film so that the load cell could not have intended water resistance. If the thickness were larger than 100 μm, the detection precision of the sensor would be excessively low. Accordingly, the desired thickness is in a range from hundreds of micrometers to several millimeters. It is also preferable that the coating film has a uniform thickness.

According to an eighth aspect, the load cell of the third aspect further has such a feature that inorganic filler having a particle diameter of 50 μm or less is mixed in the resin of the coating layer.

The resin containing the inorganic filler is further preferable because it has resistance to smearing in addition to a sufficient hardness. In this aspect, the above resin covers the strain body for maintaining the precision of the scale while preventing the galvanic corrosion.

The inorganic filler is preferably formed of fine particles of aluminum oxide, silicon oxide or the like. It is preferable that the inorganic filler is uniformly dispersed in the resin. For this, the fine filler having a particle diameter of 50 μm is used, and is mixed in the resin at a rate from about 5% to about 60%.

In a ninth aspect of the invention, the load cell of the eighth aspect further has such a feature that the resin is acryl resin cross-linked to form a three-dimensional structure.

This load cell can achieve operation and effect similar to those of the load cell of the fifth aspect.

In a tenth aspect, the load cell of the ninth aspect further has such a feature that the coating film further has an anodized aluminum layer, and a coating layer is formed on a surface of the anodized aluminum layer.

This load cell can achieve operation and effect similar to those of the load cell of the sixth aspect.

According to an eleventh aspect, the load cell of the tenth aspect further has such a feature that the coating film has a thickness equal to or larger than 1 μm and smaller than 100 μm.

This load cell can achieve operation and effect similar to those of the load cell of the seventh aspect.

According to a twelfth aspect, the load cell of the third aspect further has such a feature that the resin of the coating layer contains inorganic filler having a particle diameter of 50 μm or less, and the inorganic filler is combined with the resin by chemical coupling.

Ceramic paint (organic/inorganic hybrid paint) is produced by combining organic and inorganic components by chemical coupling, which is introduced between the different components. As a result, the ceramic paint has the features of both the components. In the ceramic paint, the density of cross-links between organic polymers is high, and the density of cross-links between organic and inorganic polymers is also high so that the coating film has a dense structure, and thus has high resistance to moisture and water. Accordingly, the coating layer made of such paint can improve the waterproof and rustproof performances.

Since the ceramic paint has a high cross-link density, the coating layer made of the ceramic paint is hard, and is sufficiently resistant to a scratch or damage, which may be caused by an external force. Further, the inorganic components of the ceramic paint, which have resistance to smearing, weather and chemical attack, can further improve the rustproof performance of the coating layer.

In this aspect, therefore, the coating layer is made of the ceramic paint so as to provide the surface of the strain body having appropriate hardness, smear resistance (affinity for water), electrical insulating property and others.

According to a thirteenth aspect, the load cell of the twelfth aspect further has such a feature that a silane treatment is effected on a surface of the inorganic filler.

If the filler in the resin is chemically coupled with the resin to form composites, it promotes formation of the three-dimensional structure of the resin, and contributes to formation of a hard and stable coating film.

In this aspect, therefore, predetermined processing, and particularly, the silane processing is effected on the surface of inorganic filler so as to achieve chemical coupling with the resin. Thereby, a functional group such as an amino or hydroxyl group is introduced into the filler surface. Further, a heat treatment is effected after the application of the resin so that the chemical coupling between the inorganic filler and the resin can be promoted via a multifunctional (usually, bifunctional) compound (crosslinking agent) in the resin.

In this case, the heat treatment is substantially performed at a temperature from 150 to 200° C. for 10 to 30 minutes. Application of the resin is preferably performed by a spray, a brush or the like.

According to a fourteenth aspect, the load cell of the thirteenth aspect further has such a feature that the resin is an acryl resin cross-linked to have a three-dimensional structure.

This aspect relates to a case where the coating layer employs ceramic paint (organic/inorganic hybrid paint) made of the organic component of the acryl resin and the inorganic component of the inorganic filler.

As already described, the coating layer made of the organic/inorganic hybrid paint has an improved hardness. In the load cell of this aspect, therefore, the strain body can have improved resistance to water, rust and corrosion.

According to a fifteenth aspect, the load cell of the fourteenth aspect further has such a feature that the coating film further has an anodized aluminum layer, and the coating layer is formed over the surface of the anodized aluminum layer.

The load cell of this aspect can achieve operation and effect similar to those of the load cells of the sixth and tenth aspects.

According to a sixteenth aspect, the load cell of the fifteenth aspect further has such a feature that the coating film has a thickness equal to or larger than 1 μm and smaller than 100 μm.

The load cell of this aspect can achieve operation and effect similar to those of the load cells of the seventh and eleventh aspects.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8 shows the fact that a flexible printed board can be applied to strain bodies of different sizes;

DETAILED DESCRIPTION OF THE PREFERRED EMBODIMENTS

<Schematic Structure of Load Cell>

Figure 1:
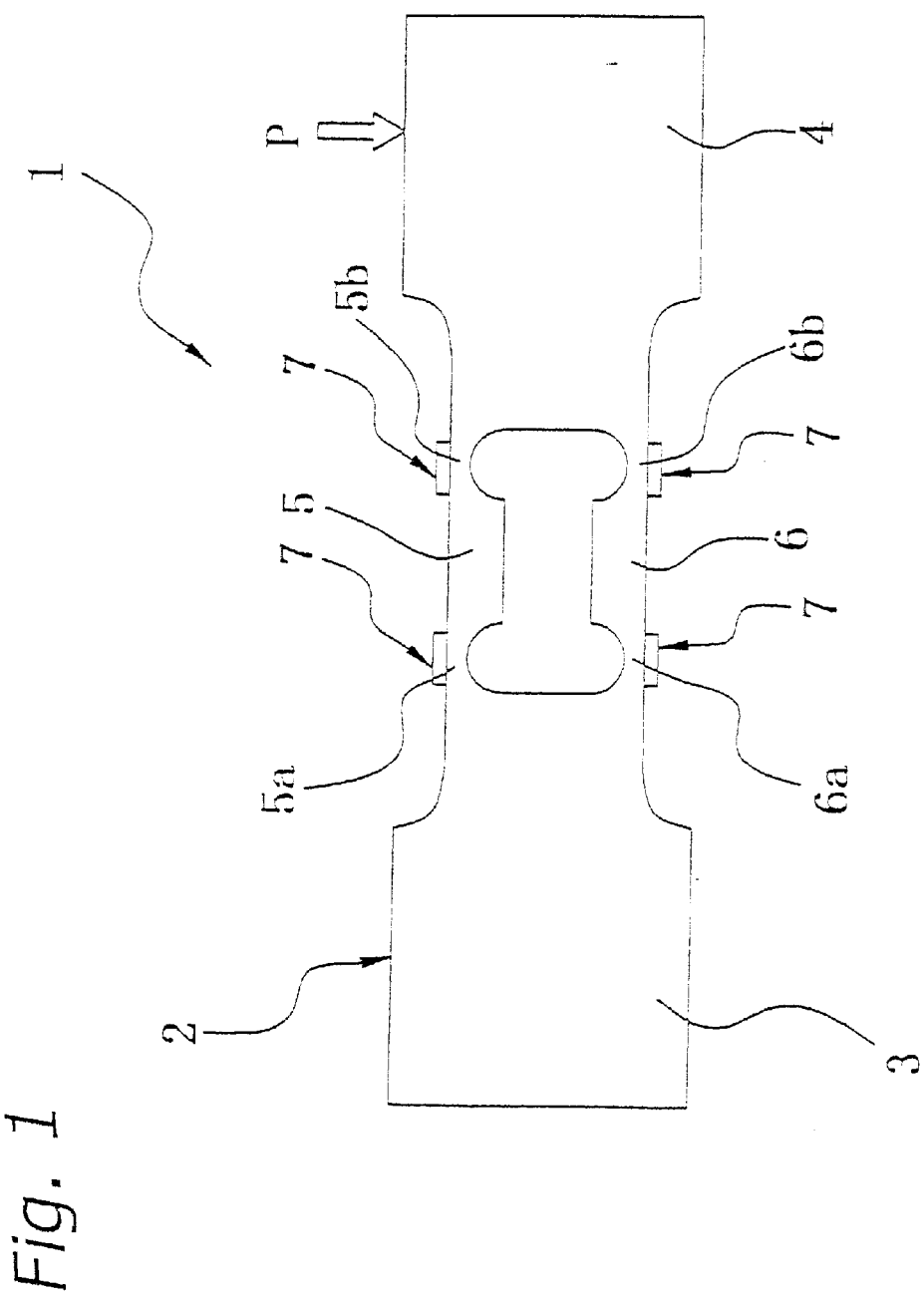
FIG. 1 is a side view of a load cell according to an embodiment of the invention.

A load cell 1 according to an embodiment of the invention is shown in FIG. 1. The load cell 1 is primarily formed of a strain body 2 and four strain gauges (sensors) 7.

The strain body 2 has a fixed rigid portion 3 and a movable rigid portion 4 at its opposite ends, respectively, and these rigid portions 3 and 4 are coupled together by upper and lower (i.e., two) beams 5 and 6 (strain occurring portion). The strain body 2 is primarily made of aluminum alloy.

Figure 6:
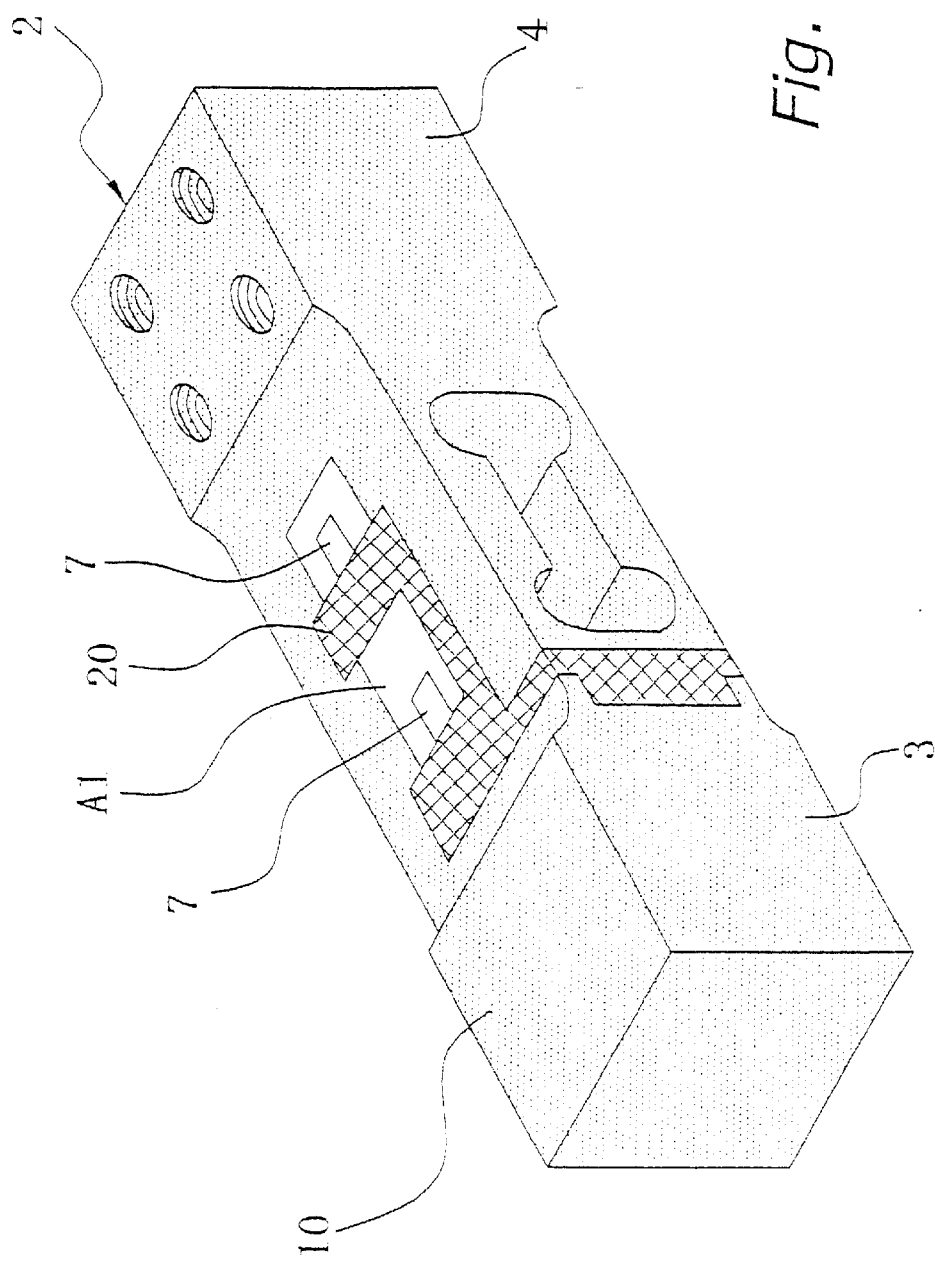
FIG. 6 is a perspective view of the strain body as well as a strain gauge and a flexible printed board attached thereto.

The two beams 5 and 6 are provided with thin strain measuring portions 5a and 6a located near the fixed rigid portion 3 as well as thin strain measuring portions 5b and 6b located near the movable rigid portion 4, respectively. To these strain measuring portions 5a, 5b, 6a and 6b, the strain gauges 7 are attached or adhered as shown in FIGS. 1 and 6, respectively. These strain gauges 7 are connected to a Wheatstone bridge, and can detect strains (degrees of deformation), which are caused in the strain body 2 by a load P applied to the movable rigid portion 4, in accordance with changes in electrical resistance. A load (i.e., a weight of a measuring target object) is calculated from results of the detection by these strain gauges 7.

<Example of Scale with Load Cell>

Figure 2:
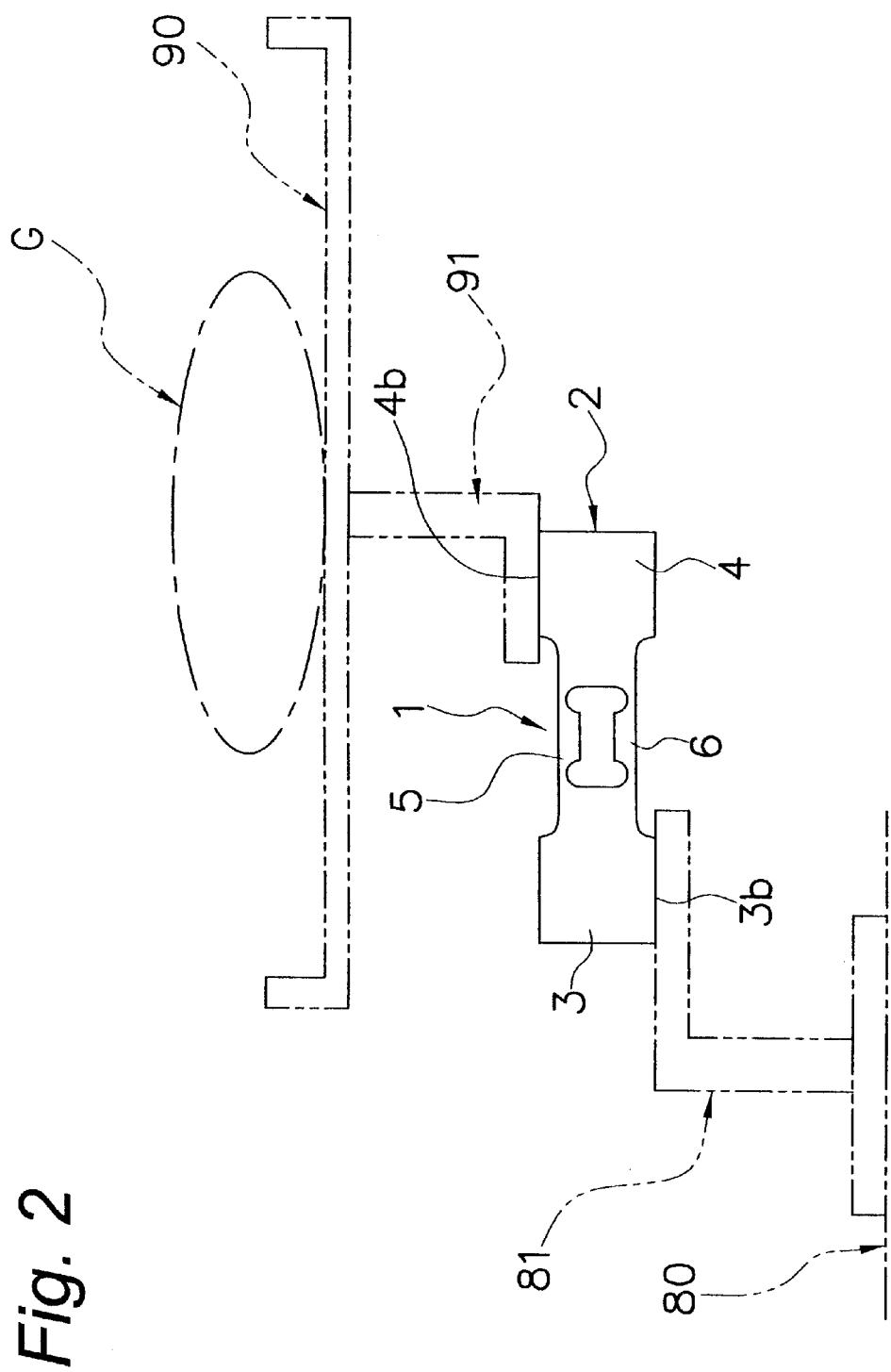
FIG. 2 is a schematic view of a scale employing the load cell.

As shown in FIG. 2, the load cell 1 is attached, e.g., to a fixed base 80 and a support member 90 supporting a measuring target object G, i.e., object to be measured, and forms a component of a scale.

In the example shown in FIG. 2, the fixed rigid portion 3 of the strain body 2 is, at a fixing portion 3b (first portion), attached to a fixed connection member 81 fixed to the fixed base 80, and the movable rigid portion 4 of the strain body 2 is, at a fixing portion 4b (another first portion), attached to a movable connection member 91 fixed to the support member 90. When the measuring target object G is placed on the support member 90, the load P (see FIG. 1) of the measuring target object G acts on the movable rigid portion 4 of the strain body 2 via the movable connection member 91, and displaces the movable rigid portion 4 downward.

Since the fixed rigid portion 3 is fixed to the fixed base 80, the strain body 2 deforms to extend the strain measuring portions 5a and 6b, and shrink the strain measuring portions 5b and 6a. The strain gauges 7 detect strains of the strain body 2 thus deformed.

The fixed and movable connection members 81 and 91 are made of stainless steel, which is superior in resistance to rust and corrosion.

21 Specific Structure of Strain Body and Coating>

For completing the load cell 1, coating or the like is applied to the strain body 2, and the strain gauges 7 and wiring are attached thereto. Description will now be given on processing for them.

(Formation of Coating Film)

Figure 3:
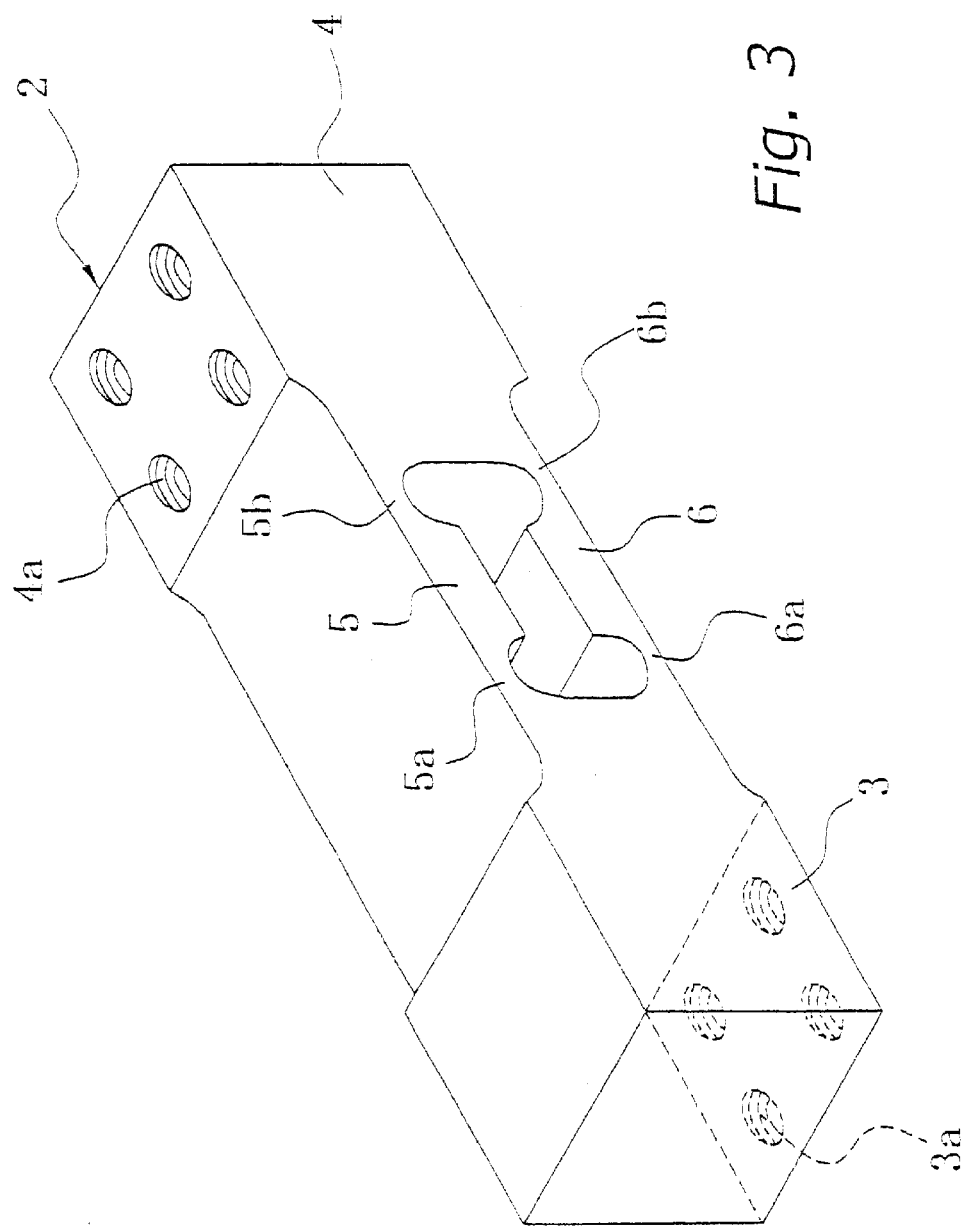
FIG. 3 is a perspective view of a strain body.
Figure 4:
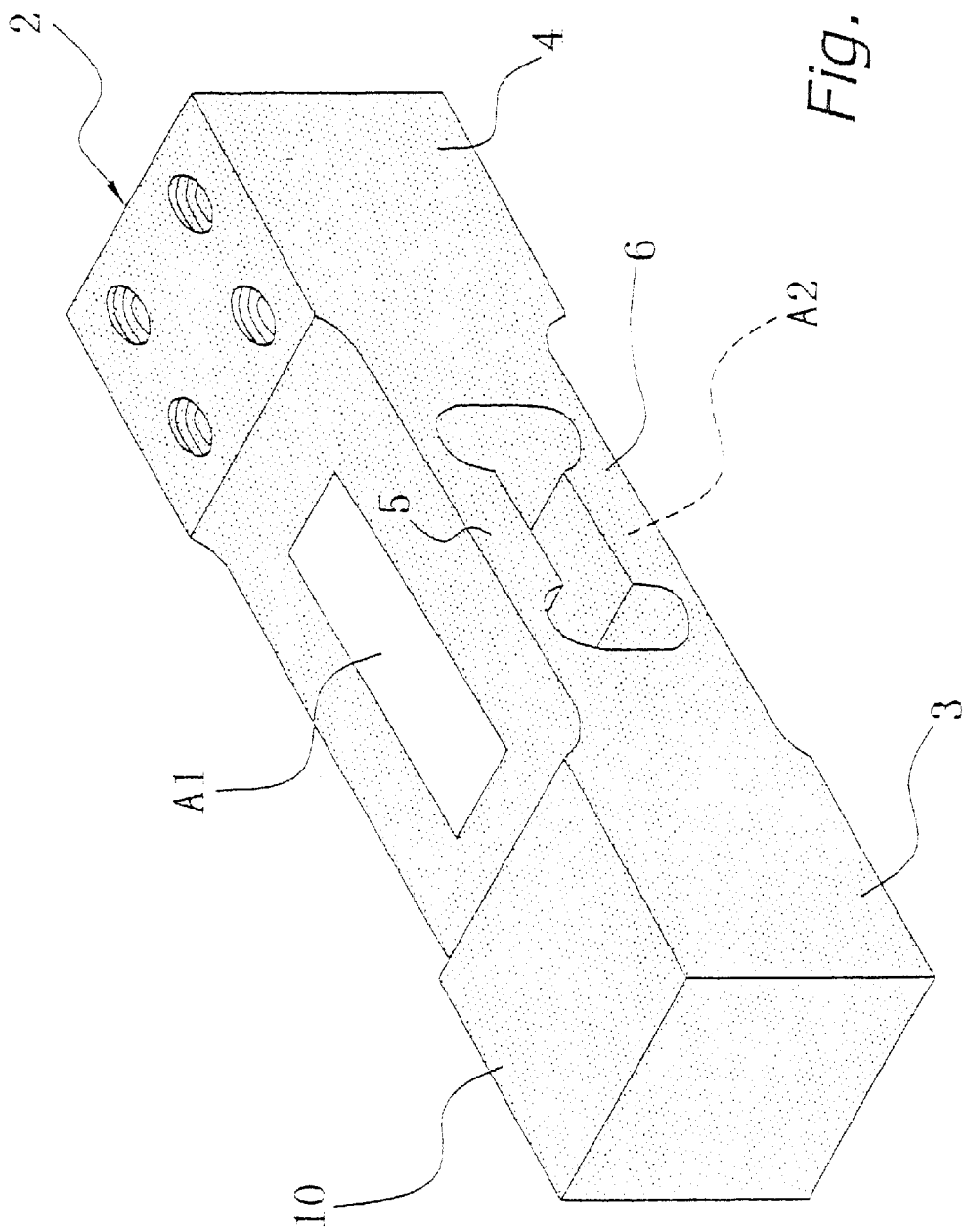
FIG. 4 is a perspective view of the coated strain body.

The strain body 2, which has a predetermined configuration shown in FIG. 3 and is made of aluminum alloy, is first subjected to processing of forming an anodic oxide film 10a (anodized aluminum layer) in a sulfuric acid bath, and then is subjected to spray coating with organic/inorganic hybrid paint ("BELL CLEAN No. 1000" manufactured by NOF Corporation). After the spray coating, baking is performed at 190° C. for 30 minutes so that a coating film 10 is formed as shown in FIG. 4. The baking processing is preferably performed at a temperature ranging from 150° C. to 200° C. for a time period ranging from 10 to 30 minutes after reaching a predetermined temperature.

Basically, the whole surface of the strain body 2 is coated with the anodized aluminum layer 10a and the coating layer 10b. When forming these layers, masking is effected on portions, on which the strain gauges 7 will be attached later, i.e., on an area A1 in an upper surface of the beam portion 5 and an area A2 in a lower surface of the beam portion 6. Thereby, the coating film 10 is formed over the whole surface of the strain body 2 except for the areas A1 and A2 (second portion), as shown in FIG. 4. Thus, the coating film 10 is formed over the portion except for portions, to which the strain gauges 7 are attached, and portions around these portions for the strain gauges 7 (i.e., areas A1 and A2).

(Correction of Influence by Coating with Hard Resin)

The coating with hard resin such as ceramic paint affects creep characteristics of the load cell 1. The creep characteristics are defined by a voltage changing phenomenon caused by changes in resistance of the strain gauge 7, which occur due to change in amount of strain determined by the strain gauge 7. This change in amount of strain occurs with time when the strain gauge 7 determines the deformation of the strain body 2 made of aluminum alloy or the like due to a load.

As countermeasures against the above phenomenon, a manner of appropriately combining a time constant of deformation of the strain body 2 and a time constant of the strain gauge 7 (including an adhesive layer and a coating agent) during determination of the strain is generally employed to provide a state, in which the strain amount determined by the strain gauge 7 does not depend on elapsing of time.

More specifically, the following manners are generally employed.

(1) A configuration or form of a strain occurring portion of the strain body 2 is changed.

(2) A configuration or form (e.g., longitudinal size, and/or a form of a folded-back portion) of a resistor in the strain gauge 7 is changed.

(3) A material and/or composition of a base member of the strain gauge 7 is changed (see the publication of Japanese Patent Application No. 64125/1999 filed by Alpha Electronics Co., Ltd. and Ishida Co. Ltd.).

If the strain body 2 is coated with hard resin according to the present invention, the time constant of deformation of the strain body 2 changes. Therefore, for the operation, in which the change occurs in time constant of deformation of the strain body 2 caused by effects including an influence of the resin, the foregoing manners (2) and (3) are employed to change the time constant of the strain gauge 7 to produce the state, in which the strain amount determined by the strain gauge 7 is independent of the time elapsing.

Figure 5:
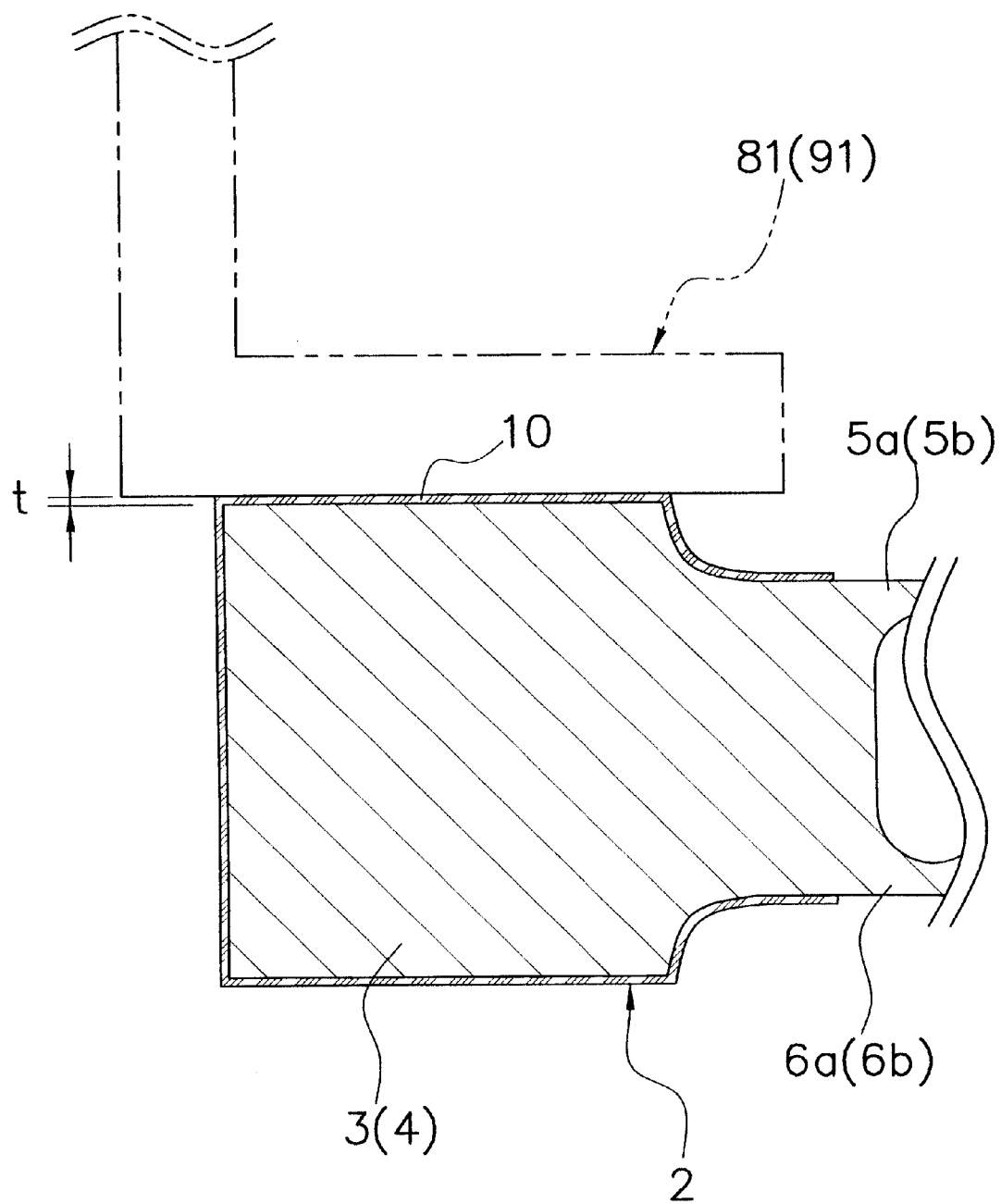
FIG. 5 is a fragmentary cross section of the coated strain body.

FIG. 5 fragmentarily shows a section of the strain body 2 coated with the coating film 10. The coating film 10 has a thickness equal to a sum of a thickness of 5 μm±2 μm of the anodized aluminum layer 10a and a thickness of 15 μm±5 μm of the coating layer 10b. The coating film 10 has an electrically insulating property, and will serve as an electrical insulator between the fixed rigid portion 3 (and movable rigid portion 4) and the fixed connection member 81 (movable connection member 91) fixed thereto by screws or the like in a later step. As shown in FIG. 3, the fixed and movable rigid portions 3 and 4 are provided with screw holes 3a and 4a for fixing the fixed and movable connection members 81 and 91 by screws or the like. Also, the glass transition temperature of the coating layer 10b is 40° C. or more. Therefore, the coating film 10 is hard in a temperature range from −10° C. to 40° C., which is an operation temperature range of this kind of scale. Since the coating film 10 is extremely thin and hard, high weight detection precision can be maintained while insulating the strain body 2 from the dissimilar metal member fixed or attached thereto and hardly affecting the degree of fixing of them.

(Attachment of Strain Gauge and Flexible Printed Board)

After forming the coating film 10 over the surface of the strain body 2 as shown in FIG. 4, the strain gauges 7 and a flexible printed board 20 are attached to the strain body 2 as shown in FIG. 6. A terminal of each strain gauge 7 is connected to wiring in the flexible printed board 20. The flexible printed board is employed for simplifying a wiring work for the strain gauges 7 and bridge circuit formed of resistances for output compensation and others.

Figure 7:
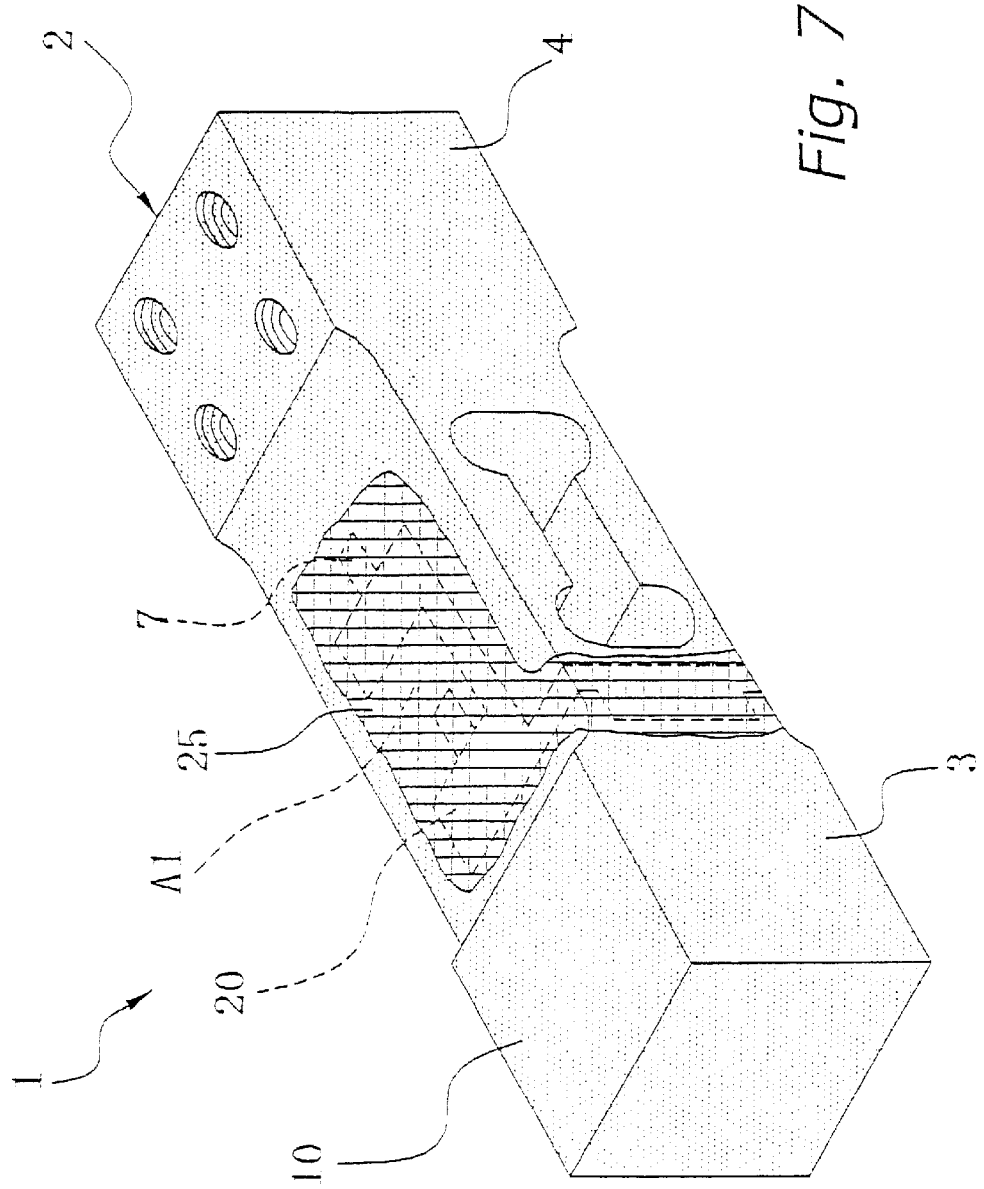
FIG. 7 is a perspective view of the strain body provided with resin covering the strain gauge and others.

After the strain gauges 7 and the flexible printed board 20 are attached to the strain body 2, resin is applied to cover the strain gauges 7, the flexible printed board 20 and the exposed areas A1 and A2 of the strain body 2. More specifically, silicone resin 25 is applied over a waterproof butyl rubber sheet so that the strain gauges 7 and the flexible printed board 20 are externally covered, as shown in FIG. 7.

<Features of Load Cell of the Embodiment>

(1)

In the load cell 1, the strain body 2 is primarily made of aluminum alloy, and the fixed and movable connection members 81 and 91 attached thereto are primarily made of stainless steel. Therefore, if the connection members 81 and 91 were in direct contact with the strain body 2 when fixed by the screws, a galvanic current would flow between the dissimilar metal materials. Therefore, the strain body 2 would be rapidly corroded if moisture or oxygen is present.

For avoiding the above, the coating film 10 having the insulating property is formed at least over the surface portions of the strain body 2, to which the connection members 81 and 91 are attached, as shown in FIGS. 4 and 5. Owing to this, the insulating coating film 10 is present between the different kinds of metal materials, i.e., the strain body 2 and the connection members 81 and 91 fixed thereto. Accordingly, the current does not flow between them although the strain body 2 is dissimilar in material to the connection members 81 and 91. Thereby, the galvanic corrosion does not occur, and it is possible to suppress the corrosion of the strain body 2, which may reduce the lifetime of the load cell 1.

(2)

In the load cell 1, the coating film 10 interposed between the strain body 2 and the connection members 81 and 91 may lower the degree of fixing between them, and thus may adversely affect the weight detection precision. However, the influence by the coating film 10 is extremely small as compared with a structure having a thick molded member or the like interposed for insulation. In other words, since the coating film 10 is extremely thin, the weight detection precision can be kept high while insulating the connection members 81 and 91 fixed to the strain body 2 from the strain body 2 without substantially affecting the degree of fixing between them.

More specifically, the coating film 10 has a thickness t from several micrometers to tens of micrometers. This is based on the determination or consideration that the thickness of the coating film 10 must be smaller than 100 μm for ensuring the intended degree of fixing of the connection members 81 and 91 to the strain body 2, and maintaining the intended weight detection precision. By keeping the thickness t of the coating film 10 lower than 100 μm, lowering of the degree of fixing between the strain body 2 and the connection members 81 and 91 can be suppressed to an extent hardly affecting the weight detection precision.

Since the appropriate value of the thickness t of the coating film 10 depends on the kind and size of the load cell 1, the thickness t of the coating film 10 can be appropriately determined depending on the load cell 1 within a range not exceeding 100 μm.

(3)

In this load cell 1, the coating film 10 interposed between the strain body 2 and the strain gauge 7 may cause such a situation, depending on its characteristics and thickness t, that the displacement of the strain body 2 is not directly reflected in the output value of the strain gauge 7.

Accordingly, the coating film 10 is not formed on portions, where the strain gauges 7 are to be adhered, and neighboring portions (i.e., areas A1 and A2 in FIG. 4). This improves the reliability of the result of detection by the strain gauges 7, and can maintain high weight detection precision of the load cell 1.

(4)

In the load cell 1, since the surface of the strain body 2 is covered substantially entirely with the coating film 10, it is possible to intercept the current between the strain body 2 and the connection members 81 and 91, and it is also possible to suppress the contact of oxygen and moisture in the atmosphere with the strain body 2 so that occurrence and progression of the corrosion of the strain body 2 can be suppressed.

Further, the load cell 1 of this embodiment has such a structure that the resin covers the strain gauges 7, the flexible printed board 20 including wiring, and the areas A1 and A2, where the coating 10 is not formed, as shown in FIG. 7. Therefore, it is possible to suppress adverse effects, which may be exerted by moisture in the atmosphere on the strain gauges 7, wiring and strain body 2.

(5)

In the load cell 1, since the coating film 10 is formed of the organic/inorganic hybrid paint, the surface can have appropriate hardness, resistance to smearing (affinity for water) and electrically insulating property. More specifically, the coating film includes the coating layer, of which base is formed of hard resin. Therefore, the intended weight detection precision can be effectively maintained while preventing galvanic corrosion of the contact portions of the dissimilar metal members, and the water resistance, external appearance and others can be improved in the portion other the contact portions.

In particular, if the resin including the inorganic filler is used in the coating layer, the surface of the coating film 10 has the affinity for water. Therefore, even when dust or smear adheres to the strain body surface, the water moves under the smear to float and wash away the smear. Owing to this self-washing function, the dust, smear or the like is removed. Therefore, the smear containing salinity or metal components, which promote the corrosion, is not accumulated, and the occurrence and progression of the strain body can be suppressed.

(6)

In the load cell 1, the flexible printed board 20 can be adapted to the strain bodies of different sizes. As shown in FIG. 8, the flexible printed board 20 can be attached to either of the strain body 2 in FIG. 8(a) having a width W1 and a strain body 102 in FIG. 8(b) having a width W2 larger than the width W1. In either case, the strain gauges 7 are arranged on a center in the widthwise direction of the strain body 2 or 102.

Since the flexible printed board 20 can be adapted to the strain bodies of different widths, it is not necessary to design the flexible printed board every time the width of the strain body is changed, as is required in a conventional structure. This brings about a cost advantage.

<Other Embodiments>

(A)

In the embodiment described above, the strain gauge 7 is adhered to the strain body 2. However, the strain gauge may be formed on the strain body 2 as disclosed in the Japanese Patent No. 2,506,064.

(B)

In the embodiment described above, the coating film 10 is formed by application. However, the coating film may be formed by another manner such as vapor deposition or sputtering.

(C)

In the embodiment described above, the dissimilar metal members attached to the strain body 2 are the fixed and movable connection members 81 and 91. In the load cells 1 having structures other than the above, the dissimilar metal members may be portions of the fixed base 80 and support member 90, the screws or limiter members such as metal pieces employed for restricting deformation of the strain body 2 when an excessively large load is applied to the strain body 2, or a printed board made of metal dissimilar to the strain body 2. In any one of these structures, the coating film 10 formed over the surface of the strain body 2 can suppress galvanic corrosion of the strain body 2.

(D)

In the embodiment described above, the load cell 1 is provided at its opposite ends with the fixed and movable rigid members 3 and 4, and also has the two beam portions 5 and 6. However, the invention can be applied to various types of load cells, for example, having such structures that the strain body has the fixed and movable rigid portions at positions other than the above, that the strain body has only one beam portion, and that compressive deformation of the strain body 2 is detected instead of tensile deformation.

(E)

In the above embodiment, the coating is performed while masking the areas A1 and A2, to which the strain gauges 7 are attached, as shown in FIG. 4 so that provision of the coating film 10 may not adversely affect the result of detection or measurement by the strain gauges 7.

However, even if the strain gauge 7 is adhered onto the coating film 10, an adverse effect exerted on the detection result of the strain gauges 7 by the coating film 10 may be extremely small, or the provision of the coating film 10 may hardly affect the detection result of the strain gauges 7 because the thickness t of the coating film 10 is extremely small. In these cases, the coating film 10 may be formed over the entire surface of the strain body 2 without masking.

IMPLEMENTATION EXAMPLE

<Evaluation of Waterproof Performance>

Evaluations were performed on the rustproof performance of the structure having the coating film 10 over the strain body 2.

First, the strain body 2 made of copper-contained aluminum alloy of No. 2000 series was prepared, and then the anodizing was effected on the strain body 2, of which a portion used for attaching the strain gauges 7 is masked. The anodized portion of the strain body 2 was subjected to spray coating with organic/inorganic hybrid paint ("BELL CLEAN No. 1000" manufactured by NOF Corporation) to form the coating layer.

In this implementation example, the coating was also applied to screw portions near or around the screw holes 3a and 4a. However, application of the paint to these portions is not essential.

After the application of the paint, the strain gauges 7 were attached to the strain body 2 (implementation example 1).

As a comparison example, the strain body 2 was prepared and processed similarly to the implementation example 1 except for that a rubber-contained material ("SB243L" manufactured by Nitto Denkou Corporation.) was used instead of the organic/inorganic hybrid paint (comparison example 1).

Figure 9:
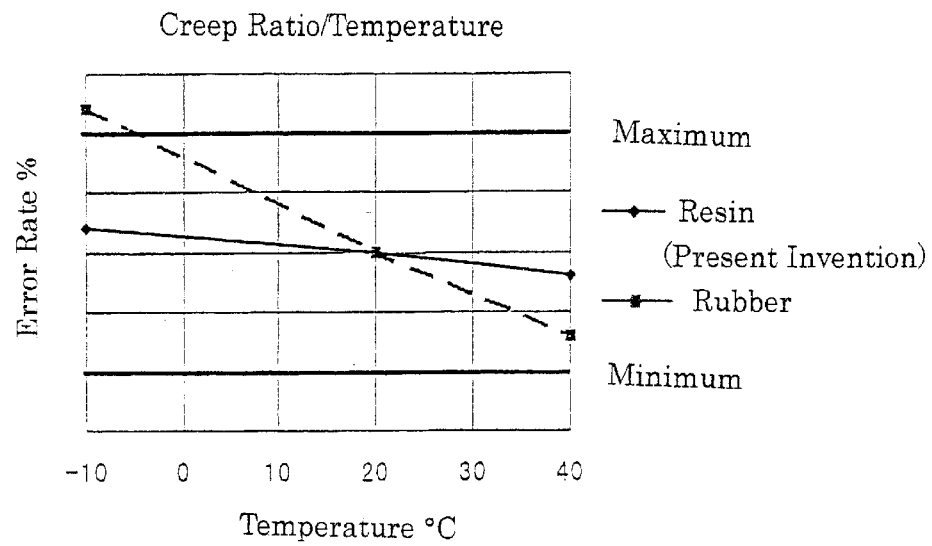
FIG. 9 is a graph showing a result of evaluation of a waterproof performance in an implementation example.

Changes in creep characteristics of the implementation example 1 and the comparison example 1 were measured while changing the temperature within an operation temperature range (from −10° C. to 40° C.) of the scale. The results of measurement are shown in FIG. 9.

<Salt Water Spray Test>

In this test, evaluations were effected on the effect of suppressing the galvanic corrosion by the coating film 10 in the structure, which has the dissimilar metal connected to the strain body 2 coated with the coating film 10.

Figure 10:
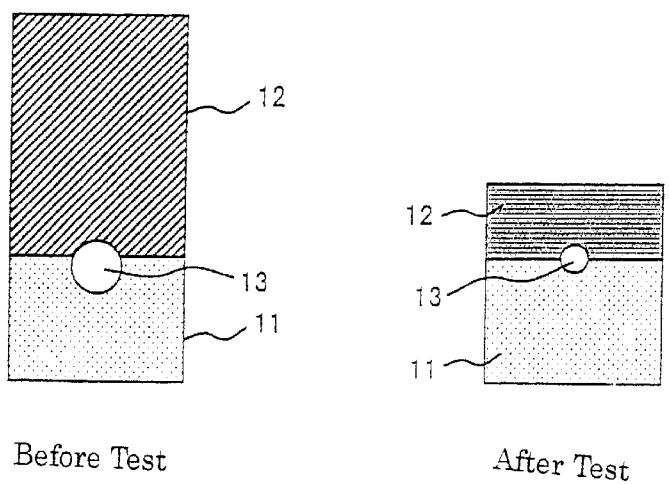
FIG. 10 is a cross section showing specimens used in a salt water spray test in the implementation example.
Figure 11:
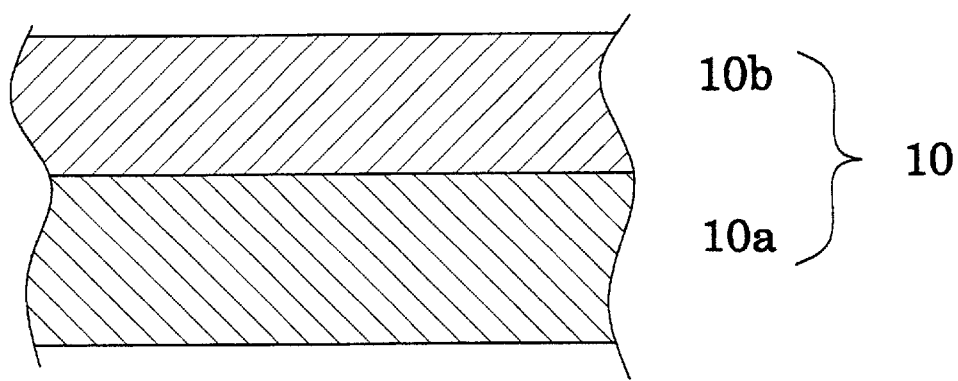
FIG. 11 is a cross sectional view of the coating film.

First, an organic/inorganic hybrid paint and a conventional paint (clear paint in this example) 9 were applied to two aluminum plates, respectively, and then these two plates were adhered to the plates made of stainless steel SUS304. The former will be referred to as an "implementation example 2", and the latter will be referred to as a "comparison example 2"). As shown in FIG. 10, a flat head screw made of stainless steel was disposed between the aluminum plate and the stainless steel plate. In FIG. 10 reference numbers 11, 12 and 13 indicate the aluminum plate, stainless steel plate and flat head screw, respectively.

In a method according to the Japanese Industrial Standards (JIS-Z-2371), salt water was spayed to the implementation example 2 and the comparison example 2 for 200 hours, and then an area of the corroded portion in the contact region between each aluminum plate and the corresponding stainless steel plate was measured. The results of this measurement were shown in the following table 1. In the table, each numeric value with "%" represents a rate of the area of the portion corroded by the test with respect to the area of the uncorroded portion before the test.

TABLE 1

| Salt Water Spray Time (hr) | Implementation Example 2 (%) | Comparison Example 2 (%) |
|---|---|---|
| 0 | 0 | 0 |
| 200 | 5 | 80 |

INDUSTRAIL APPLICABILITY

According to the invention, the insulating coating film covers the portion of the strain body, to which the member (dissimilar metal member) made of the metal material dissimilar to the strain body is attached, for preventing the galvanic corrosion of the strain body and the attached dissimilar metal member in contact with the same. Therefore, an electricity hardly flows between the dissimilar metal members and the strain body, and the galvanic corrosion does not occur, although these are made of dissimilar metal materials.

Since the coating film is extremely thin, it can insulate the strain body from the dissimilar metal member attached thereto without exerting a substantial influence on the degree of fixing between them, and the weight detection precision can be maintained high.

Further, the coating film contains the coating layer of the paint, of which base is made of hard resin. Therefore, the coating film can effectively maintain the weight detection precision while preventing the galvanic corrosion. In the portion not in contact with the dissimilar metal, the coating film can improve the water resistance.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A load cell for use with a fixing connector and a moving connector of a measuring device, at least one of the fixing connector and moving connector being made of a first metal material, said load cell comprising:
    a strain body having on its surface a strain occurring portion and first and second portions, at least one of the fixing connector and the moving connector being attachable to said first portion of said strain body, said second portion being located within said strain occurring portion, said strain body being made of a second metal material that is different from the first metal material;
    a bridge circuit formed of a strain gauge arranged on said second portion located within said strain occurring portion of said strain body; and
    a coating film formed on a portion of said strain occurring portion excluding said second portion for suppressing corrosion of said strain body, said coating film having an electrical insulating property and including a coating layer made of resin having a glass transition temperature of 40° C. or more.

2. The load cell according to claim 1, wherein
said coating film further covers said first portion to which at least one of the fixing connector and the moving connector being made of the first metal material is attachable.

3. The load cell according to claim 1, wherein
said resin of the coating layer is acryl resin.

4. The load cell according to claim 3, wherein
said acryl resin is cross-linked to form a three-dimensional structure.

5. The load cell according to claim 4, wherein
said coating film further has an anodized aluminum layer, and said coating layer is formed on a surface of said anodized aluminum layer.

6. The load cell according to claim 5, wherein
said coating film has a thickness equal to or larger than 1 μm and smaller than 100 μm.

7. The load cell according to claim 1, wherein
inorganic filler having a particle diameter of 50 μm or less is mixed in the resin of said coating layer.

8. The load cell according to claim 7, wherein
said resin is acryl resin cross-linked to form a three-dimensional structure.

9. The load cell according to claim 8, wherein
said coating film further has an anodized aluminum layer, and said coating layer is formed on a surface of said anodized aluminum layer.

10. The load cell according to claim 9, wherein
said coating film has a thickness equal to or larger than 1 μm and smaller than 100 μm.

11. The load cell according to claim 1, wherein
said resin of the coating layer contains inorganic filler having a particle diameter of 50 μm or less, and said inorganic filler is combined with said resin by chemical coupling.

12. The load cell according to claim 11, wherein
a silane treatment is effected on a surface of said inorganic filler.

13. The load cell according to claim 12, wherein
said resin is an acryl resin cross-linked to have a three-dimensional structure.

14. The load cell according to claim 11, wherein
said coating film further has an anodized aluminum layer, and said coating layer is formed on a surface of said anodized aluminum layer.

15. The load cell according to claim 11, wherein
said coating film has a thickness equal to or larger than 1 μm and smaller than 100 μm.

16. A load cell for use with a fixing connector and a moving connector of a measuring device, at least one of the fixing connector and moving connector being made of a first metal material, said load cell comprising:
    a strain body having on its surface a strain occurring portion and first and second portions, at least one of the fixing connector and the moving connector being attachable to said first portion of said strain body, said second portion being located within said strain occurring portion, said strain body being made of a second metal material that is different from the first metal material;

a bridge circuit formed of a strain gauge arranged on said second portion located within said strain occurring portion of said strain body; and a coating film formed on said first portion to which at least one of the fixing connector and the moving connector made of the first metal material is attachable, for interrupting current between the first and second metal materials, said coating film having an electrical insulating property and including a coating layer made of resin having a glass transition temperature of 40° C. or more.

17. The load cell according to claim 16, wherein
said resin of the coating layer is acryl resin.

18. The load cell according to claim 17, wherein
said acryl resin is cross-linked to form a three-dimensional structure.

19. The load cell according to claim 18, wherein
said coating film further has an anodized aluminum layer, and said coating layer is formed on a surface of said anodized aluminum layer.

20. The load cell according to claim 19, wherein
said coating film has a thickness equal to or larger than 1 $\mu$m and smaller than 100 $\mu$m.

21. The load cell according to claim 16, wherein
inorganic filler having a particle diameter of 50 $\mu$m or less is mixed in the resin of said coating layer.

22. The load cell according to claim 21, wherein
said resin is acryl resin cross-linked to form a three-dimensional structure.

23. The load cell according to claim 22, wherein
said coating film further has an anodized aluminum layer, and said coating layer is formed on a surface of said anodized aluminum layer.

24. The load cell according to claim 23, wherein
said coating film has a thickness equal to or larger than 1 $\mu$m and smaller than 100 $\mu$m.

25. The load cell according to claim 16, wherein
said resin of the coating layer contains inorganic filler having a particle diameter of 50 $\mu$m or less, and said inorganic filler is combined with said resin by chemical coupling.

26. The load cell according to claim 25, wherein
a silane treatment is effected on a surface of said inorganic filler.

27. The load cell according to claim 16, wherein
said resin is an acryl resin cross-linked to have a three-dimensional structure.

28. The load cell according to claim 27, wherein
said coating film further has an anodized aluminum layer, and said coating layer is formed on a surface of said anodized aluminum layer.

29. The load cell according to claim 28, wherein
said coating film has a thickness equal to or larger than 1 $\mu$m and smaller than 100 $\mu$m.

* * * * *